United States Patent
Juzak et al.

(10) Patent No.: US 11,098,825 B2
(45) Date of Patent: Aug. 24, 2021

(54) PIPE SUPPORT STRUCTURE

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V, Mijdrecht (NL)

( * ) Notice: Subject to any disclaimer, the term of this patent is extended or adjusted under 35 U.S.C. 154(b) by 0 days.

(21) Appl. No.: 16/646,392

(22) PCT Filed: Sep. 12, 2018

(86) PCT No.: PCT/NL2018/050594
§ 371 (c)(1),
(2) Date: Mar. 11, 2020

(87) PCT Pub. No.: WO2019/054860
PCT Pub. Date: Mar. 21, 2019

(65) Prior Publication Data
US 2020/0271241 A1    Aug. 27, 2020

(30) Foreign Application Priority Data
Sep. 13, 2017    (NL) .................................... 2019535

(51) Int. Cl.
*F16L 3/00*    (2006.01)
*F16L 3/26*    (2006.01)
(Continued)

(52) U.S. Cl.
CPC . *F16L 3/26* (2013.01); *F16L 3/11* (2013.01); *F16L 3/24* (2013.01); *F16L 3/243* (2019.08); *F16L 3/245* (2019.08); *F16L 3/2431* (2019.08)

(58) Field of Classification Search
CPC ......... F16L 3/245; F16L 3/2431; F16L 3/243; F16L 3/11; F16L 2/24; F16L 3/26; F16L 59/135
See application file for complete search history.

(56) References Cited

U.S. PATENT DOCUMENTS 3,051,424 A * 8/1962 Duhamel ................. F16L 3/11
                                                248/62
3,330,517 A * 7/1967 Zimmermann ......... A47F 5/103
                                                248/62
(Continued)

FOREIGN PATENT DOCUMENTS

EP        0612945      8/1994
EP        2781814      9/2014
(Continued)

OTHER PUBLICATIONS

International Search Report and Written Opinion for PCT/NL2018/050594 dated Jan. 7, 2019 (15 pages).

*Primary Examiner* — Amy J. Sterling
(74) *Attorney, Agent, or Firm* — Tutunjian & Bitetto, P.C.

(57) ABSTRACT

A pipe support assembly includes a pipe support shell body having a substantially semicylindrical wall portion conforming to an outer contour of a pipe to be supported. The shell body has a length which is greater than a width thereof and has an open top flanked by longitudinal rims and a flange formed at each of said rims. The pipe support assembly furthermore includes at least one hanger assembly adapted to be suspended from an overhead support structure and including an engagement portion for engaging at least one of the flanges of the pipe support shell body. The flanges extend outwardly from the respective longitudinal rims and are each provided with a series of perforations distributed over the length thereof. The engagement portion of the hanger assem- (Continued)

bly is adapted to be inserted at least partially through at least one of the perforations in one of the flanges.

30 Claims, 6 Drawing Sheets (51) Int. Cl.
*F16L 3/24* (2006.01)
*F16L 3/11* (2006.01)

(56) References Cited

U.S. PATENT DOCUMENTS

| | | | |
|---|---|---|---|
| 4,765,577 A | | 8/1988 | Collins et al. |
| 6,206,613 B1 | | 3/2001 | Elkins |
| 8,297,561 B1 * | | 10/2012 | Montplaisir .......... F16L 59/135 |
| | | | 248/58 |
| 9,903,524 B2 * | | 2/2018 | Lange ....................... F16L 3/11 |

FOREIGN PATENT DOCUMENTS

| | | |
|---|---|---|
| EP | 2902685 | 8/2015 |
| EP | 3187761 | 7/2017 |
| JP | S5356720 | 5/1978 |
| WO | 2012075576 | 6/2012 |

* cited by examiner

PIPE SUPPORT STRUCTURE

BACKGROUND

1. Technical Field

The present invention relates to a pipe support assembly. In particular it relates to a structure including a support shell which has an elongate form with an open top and a substantially semi-cylindrical wall.

2. Description of Related Art

Such a support assembly with a support shell made of metal is known for example from EP 0 612 945 A1 and EP 2 781 814 A1. The support shells enclose a lower half of a plastic pipe and are used as a reinforcement. Plastic pipes tend to sag if they are not supported at short intervals by e.g. pipe clips, especially if the medium that is transported through the plastic pipe is warm. The metal shells support the pipe from the underside and prevent the undesired deformation of the pipes. As a result, pipe clips to suspend the pipe can be arranged at larger intervals. Also, a metal support shell will provide additional safety in case of fire. In general the outer diameter of the pipe corresponds substantially to the inner diameter of the shell. The pipe and the support shell are supported by conventional pipe clips which are clamped around the assembly of the pipe and the support shell.

Another example of a support assembly with pipe supporting shells is disclosed in U.S. Pat. No. 4,765,577. In a possible embodiment the pipe support shell has a substantially U-shaped cross section defined by spaced sides and a curved bottom. The shell has an outstanding flange at the upper end of the respective side walls to provide lateral stability. In another embodiment the upper edges are folded outwardly and downwardly. A spring clip with hooks is provided which interlock with the folded edges of the shell. The spring clip prevents splaying of the shell. In yet another embodiment the upper edges of the shell are folded inwardly and downwardly. A spring clip with hooks is provided which interlock with the inwardly folded edges of the shell. This spring clip prevents splaying of the shell and can also be used as a hanger which suspended from a threaded rod.

WO 2012/075576 discloses a para-seismic support for pipes comprising a support member and horizontal flanges. The support member is formed as half-circle in order to receive a pipe. The flanges are provided with a plurality of holes to secure vertical support lines thereon to support the para-seismic support from a ceiling. The para-seismic support furthermore comprises an axial side plate extending in a generally vertical plane perpendicular to the axis of the pipe and having attachment holes for attaching a support element.

SUMMARY OF THE INVENTION

The invention has for an object to provide a more versatile pipe support assembly than the known pipe support assemblies.

This object is achieved by a pipe support assembly according to the present application.

According to the present invention the flanges at the rims of the pipe support shell body are each provided with a series of perforations distributed over the length. The engagement portion of the hanger assembly is adapted to be inserted through at least one of the perforations in one of the flanges.

The cooperation of the engagement portion that is at least partially inserted in one or more of the perforations provides a secure fixation of the shell body to the hanger assembly such that, after it is installed, the shell body cannot move in the longitudinal direction with respect to the hanger assembly. However, the assembly is flexible in use during mounting, because an installer can easily position the hanger and the shell body relative to each other and interlock the engagement portion of the hanger assembly and the desired perforation(s) of the flange(s) of the shell body.

In a preferred embodiment of the pipe support assembly according to the invention said hanger assembly comprises a hanger bracket having an engagement portion comprising a hook member at a terminal end of the bracket adapted for a hooking engagement with one of the flanges of the shell body, and wherein the hook member has one or more projections adapted to be inserted through one or more of the perforations in the flange. The projections extending through the perforations in the flanges of the shell body prevent that the shell body can shift in longitudinal direction with respect to the hanger bracket.

In a further embodiment the hanger bracket has two depending bracket legs each including said engagement portion, wherein the hook member is formed at the end of each of the bracket legs.

In a further embodiment the hanger bracket comprises a clamp portion connected to each of the bracket legs and extending over the open top of the shell body. The clamp portion is preferably adapted to be tightened around the pipe to be supported. The clamp portion can prevent or at least mitigate longitudinal movement of the pipe with respect to the shell body. Such longitudinal movement could for example be induced by temperature differences.

In a further embodiment the clamp portion comprises two clamp strap portions, each one connected to one of the bracket legs, and each one at an end remote from the bracket legs being provided with a tightening flange, wherein the tightening flanges face each other and are provided with an aperture and a tightening element is provided to extend through said apertures and tighten the tightening flanges towards each other.

In a possible embodiment the clamp portions are made in one piece with the bracket legs, wherein, preferably, the outer contour of the clamp portion is cut out of the bracket leg and bent away from the bracket leg.

In a practical embodiment the tightening element to tighten the tightening flanges of the clamp strap portion towards each other is a screw or a bolt.

In a possible embodiment the bolt or screw has a head which fits through the cutout left by the bent away clamp portion. Thereby the screw head can engage the tightening flange of one of the straps. In an alternative, currently not preferred embodiment, the screw head may be larger than the cutout and abuts the bracket leg on an outer side, adjacent the cutout.

In a possible embodiment of the pipe support assembly the hanger assembly includes a threaded rod and the hanger bracket has a base adapted to be suspended from said threaded rod.

In a possible embodiment the hanger bracket comprises two separate bracket halves, which are joined. Preferably the bracket halves are joined at the base.

In a practical embodiment the hook member of the hanger bracket has at least two projections for engagement with two of the perforations in the flange.

In another preferred embodiment of the pipe support assembly according to the invention, said hanger assembly comprises a threaded rod and a threaded nut, said threaded rod extending downwardly from the overhead support, wherein the engagement portion includes a lower end of the threaded rod, adapted to pass through the perforations in the flanges, and wherein the nut is adapted to be screwed on the lower end of the threaded rod so as to bear the flange of the shell.

In a possible embodiment of the invention the pipe support assembly furthermore comprises a clamp comprising a strap portion adapted to be tightened around the pipe to be supported and at least one end a hook portion adapted for a hooking engagement with one of the flanges of the shell body.

In a further embodiment the hook portion at the at least one end of the strap portion has one or more projections for engagement with one or more of the perforations in the flange.

In a possible embodiment the clamp has said hook portion at both ends of the strap portion.

In a possible embodiment of the invention the pipe support assembly furthermore comprises a cable tie adapted to extend through said perforations in the flanges of the shell body, and to be tied around the pipe to be supported.

In a possible configuration the pipe support assembly may comprise at least two shell bodies, wherein end portions of the shells are arranged in an overlapping fashion such that at least a part of the series of perforations in the flanges are in register with each other, and wherein the cable tie is passing through the perforations to fix the shell bodies with respect to each other.

In a preferred embodiment of the pipe support assembly according to the invention the longitudinal rims adjoin directly the semi-cylindrical wall portion.

In a preferred embodiment of the pipe support assembly according to invention the shell flanges are folded over, such that each shell flange defines a rim channel with the semi-cylindrical wall portion of the shell.

In a preferred embodiment of the pipe support assembly according to the invention the part of the flanges having the perforations is facing the substantially same direction as the open top of the shell body.

The invention also relates to a pipe support shell body having a substantially semi-cylindrical wall portion conforming to an outer contour of a pipe to be supported, and having a length which is greater than a width thereof, wherein the shell body has an open top flanked by longitudinal rims and an outwardly extending flange formed at each of said longitudinal rims, wherein the flanges are provided with through holes distributed over the length thereof.

The invention also relates to a pipe support shell body consisting of:
a substantially semi-cylindrical wall portion having a length which is greater than a width thereof, and having longitudinal rims; and
outwardly extending flanges formed at each of the longitudinal rims of the semi-cylindrical wall, wherein the flanges are provided with through holes distributed over the length thereof. Preferably the pipe support shell body is made of metal, in particular sheet metal.

In a preferred embodiment of the pipe support shell body the longitudinal rims adjoin directly the semi-cylindrical wall portion. In this embodiment the flanges are thus at the rims of the semi-cylindrical wall portion and extend outwardly from the semi-cylindrical wall portion.

In a further embodiment of the pipe support shell body the shell flanges are folded over, such that each shell flange defines a rim channel with the semi-cylindrical wall portion of the shell.

In a possible embodiment of the pipe support shell body the part of the flanges having the perforations is facing the substantially same direction as the open top of the shell body.

The invention also relates to a pipe support assembly comprising:
a pipe support shell body having a substantially semi-cylindrical wall portion conforming to an outer contour of a pipe to be supported, and having a length which is greater than a width thereof, wherein the shell body has an open top flanked by longitudinal rims and an outwardly extending flange formed at each of said longitudinal rims, wherein the flanges are provided with through holes distributed over the length thereof, and
at least one standing saddle element comprising an anchoring portion adapted to be anchored to a support structure and a saddle portion to receive the convex side of the semi-cylindrical wall of the pipe support shell, the saddle portion including snap members at its rims to snap around the flanges of the pipe support shell body.

According to this aspect of the invention the pipe with the pipe support shell body can be supported from below, instead of being suspended by hangers from an overhead structure. The standing saddle element can be connected to a support structure situated below the support shell body, such as for example a mounting rail, which is often used in the installation business. After the saddle element is mounted to the support structure (e.g. a mounting rail), the pipe support shell can be readily clicked in the saddle element from above.

In a possible embodiment the anchoring portion has an oblong shape adapted to be aligned and inserted into a slot or oblong aperture of a channel shaped mounting rail, and after insertion to be turned to an anchoring position. The anchoring portion may take generally the form of oblong anchoring elements which are often used in connection with mounting rails such as for example "strut rails", a common mounting rail with folded in flanges that delimit a longitudinal mounting slot.

In a possible embodiment the snap members are guiding loops that bulge outwardly from an edge of the saddle portion for receiving the flanges of the pipe support shell body. These guiding loops engage around the flanges and prevent the pipe support shell body to disengage from the saddle element, but at the same time allow a shifting of the pipe support shell body in the longitudinal direction thereof. Because the saddle element is fixed to a support and is immovable, the flexibility required during installation of the assembly is provided by allowing the shell body to shift with respect of the saddle element.

It is noted that with hanger assemblies as described herein, which have an engagement portion engaging in the perforations of the flanges of the pipe support shell body, the position of the shell body relative to the hanger is fixed and no relative shifting is possible. However, the hangers are usually suspended from threaded rods, which provide by small swivelling some flexibility and allow movement for positioning of the pipe support shell body.

In a further embodiment the guiding loops, at a distal end thereof, have a guiding lip adapted to engage a flange edge of the pipe support shell and to force the loops outwardly such that the loops can move past the flange and snap back over the flange. The guiding lips facilitate the positioning of the pipe support shell body in the saddle element.

In a preferred embodiment the saddle element is formed in one piece from metal, in particular steel, more in particular spring steel by cutting and bending.

BRIEF DESCRIPTION OF THE DRAWINGS

The invention will be further elucidated in the following detailed description with reference to the drawing, in which.

DETAILED DESCRIPTION

Figure 1:
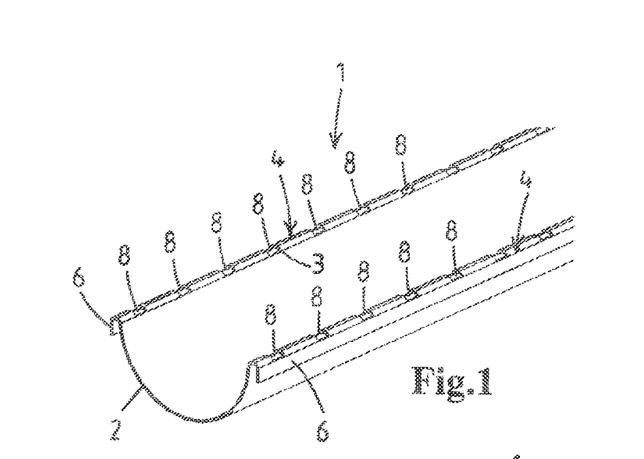
FIG. 1 shows in a view in perspective a preferred embodiment of a pipe support shell body according to the invention.

In FIG. 1 is shown a part of a support shell body 1. In a practical embodiment the pipe support shell body 1 is made of metal, in particular (thin) sheet metal.

The support shell body 1 has a channel-like form with a curved wall portion 2, which is semi-cylindrical or approximately semi-cylindrical. The support shell body 1 is adapted to receive a pipe. The inner diameter of the curved wall portion 2 conforms to the outer surface of the pipe to be supported.

Figure 2:
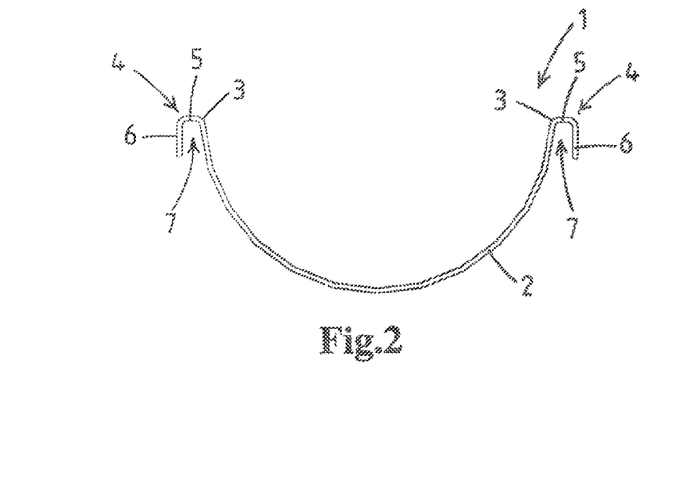
FIG. 2 shows a cross section of the pipe support shell body of FIG. 1.

At the upper end of the curved wall portion 2, as shown in FIGS. 1 and 2, the shell body 1 has longitudinal rims 3 at either lateral side of the shell body 1. At these longitudinal rims 3 a flange 4 is formed that extends outwardly.

Figure 3:
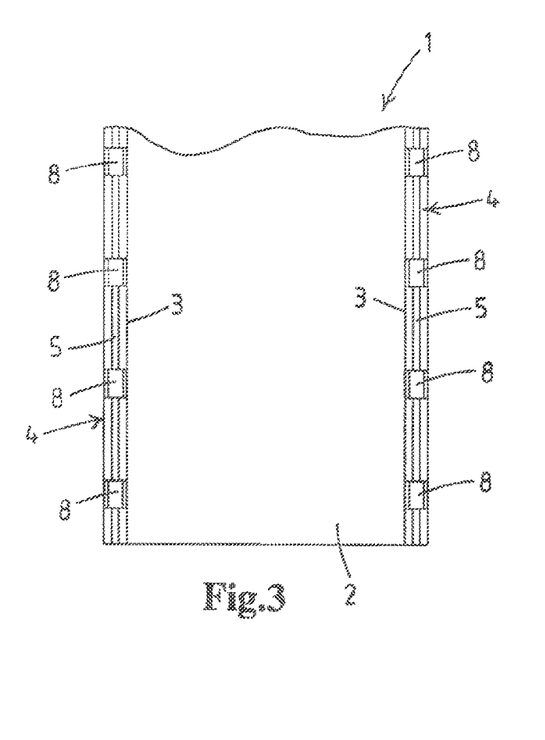
FIG. 3 shows a top elevational view of the pipe support shell body of FIG. 1.

In the embodiment shown in FIGS. 1-3 the flanges 4 are formed as folded flanges having a substantial radial part 5 and folded over part 6 that extends downwardly, such that the flange 4 and the upper region near the rim 3 of the curved wall portion 2 define a rim channel 7. The folded flange provides additional rigidity to the shell body 1. Furthermore the folded edges reduce the risk of sharp metal edges carving in the pipes outer surface during installation, which extends the life span of the pipe.

In each of the flanges 4 a series of perforations 8 is present. The perforations 8 are distributed over the length of the flange 4. In the embodiment shown in FIGS. 1-3 the perforations 8 have a pattern with an equal spacing between them as can be clearly seen FIGS. 1 and 3. However, also other perforation patterns may be possible, e.g. a series of multiple perforations with a relatively small spacing and then a larger spacing towards a following series of multiple perforations.

The shell body 1 can be suspended from an overhead support structure such as a ceiling or mounting rails, such as for example C-profiled rails or what is known in the field as "Strut" rails. Thereto a suspension element, such as a threaded rod, is fixed to the overhead support structure and extends downwardly.

In one possible embodiment according to the present invention a hanger bracket may be mounted to the threaded rod or other suspension element. This embodiment is illustrated with reference to FIGS. 4-6.

Figure 4:
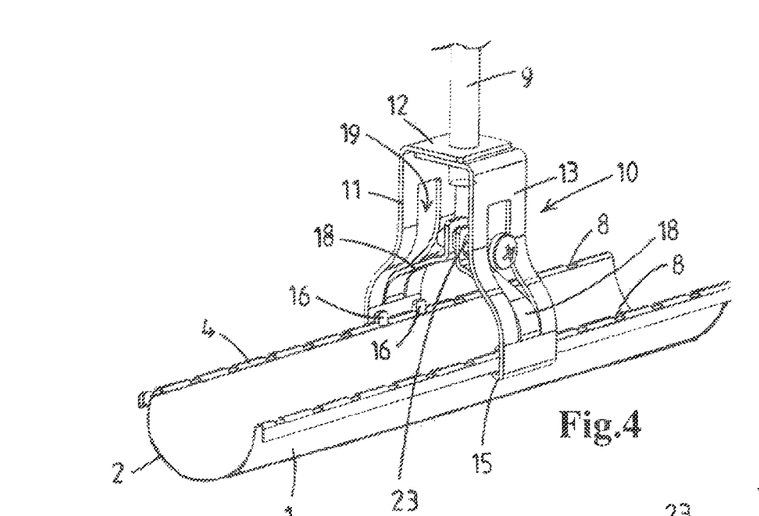
FIG. 4 shows in a view in perspective a preferred embodiment of a pipe support assembly according to the invention.

In FIG. 4 is shown the shell body 1. Furthermore a threaded rod 9 is visible which suspends from the overhead support structure. A hanger bracket 10 is mounted at a lower end of the threaded rod 9.

The hanger bracket 10 in the specific embodiment shown comprises two bracket halves 11. These bracket halves are preferably made in one piece from metal, in particular steel. However also other materials, or combinations of materials could be used.

Figure 6:
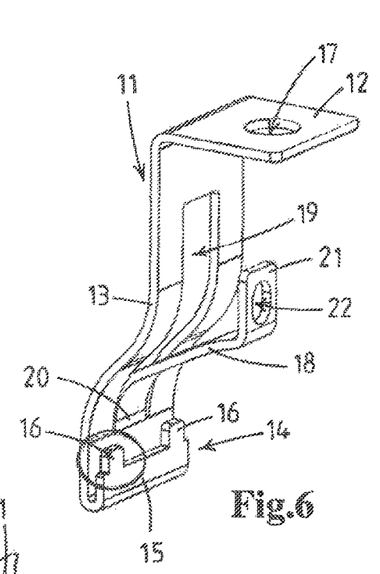
FIG. 6 shows in a view in perspective a part of a hanger bracket forming part of the pipe support assembly of FIG. 4.

In FIG. 6 a single bracket half 11 is shown. The bracket half 11 comprises a base plate 12 and a bracket leg 13 adjoining at one end the base plate 12. At an opposite end the bracket leg 13 has an engagement portion 14 comprising a hook member 15. The hook member 15 is adapted for a hooking engagement with a flange 4 of the shell body 1. In this particular embodiment the hook member 4 is adapted to hook in the rim channel 7 defined by the flange 4. When the hanger bracket 10 is mounted, the base plates 12 of the respective bracket halves 11 are arranged in an overlapping fashion and the bracket legs 13 are positioned opposite each other, such that each of the engagement portions 14 engages one of the flanges 4.

The base plates 12 are provided each with an aperture 17. When the hanger bracket is mounted the threaded rod 9 is passed through the apertures 17 in the overlapping base plates 12 as is visible in FIG. 4. This fixes the bracket halves 11 together at their upper end. A threaded nut, which is not visible in FIG. 4, may be screwed on the end of the threaded rod 9, such that the bracket 10 can be supported by the threaded rod 9.

The hook member 15 has one or more projections 16, in this case two projections 16 which extend upwardly from the hook member 15. The projections 16 are adapted to be inserted through perforations 8 in the flange 4 when the hook member 15 is received in the rim channel 7, which is visible in FIG. 4. The projections 16 extending through the perforations 8 in the flanges 4 of the shell body 1 prevent that the shell body 1 can shift in longitudinal direction with respect to the hanger bracket 10.

Figure 5:
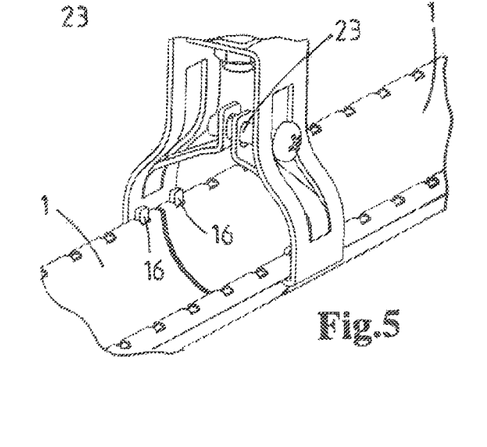
FIG. 5 illustrates in a view in perspective the pipe support assembly of FIG. 4 in an alternative mounting state.

A further advantage of the projections 16, in particular when there are at least two projections 16 at each hook member 15, is that the hanger bracket 10 can be used to interconnect two shell bodies 1 at their respective ends. An example of this is shown in FIG. 5, in which two shell bodies 1 are arranged in line and abut or nearly abut at an end. From each hook member 15 one projection 16 is inserted through a perforation 8 of one of the shell bodies 1 and another or the other projection 16 of the same hook member 15 is inserted through a perforation 8 of the other one of the shell bodies 1. Thereby the shell bodies 11 are connected to each other and the hanger bracket 10, in particular the hook members 15 thereof, functions as a connection means. Another option is that the end portions of the shell bodies 1 overlap and that one or more perforations 8 of the two shell bodies 1 are in register with each other, as is for example shown in FIG. 10, such that a protrusion 16 can extend through the registering perforations 8.

The hanger bracket is preferably made of metal. However it is also conceivable that it is made of another suitable material, e.g. plastics, or a composite material. Also a combination of metal and another material, e.g. plastics material is possible.

The features of the hanger bracket 10 as described in the above are for suspending the shell body or bodies 1 and, optionally, to interconnect shell bodies 1. The embodiment of the hanger bracket 10 that is shown in FIGS. 4-6 further has a feature to clamp a pipe to be supported in the shell body/bodies 1.

The bracket halves 11 each have a clamp strap portion 18, which is connected to the bracket leg 13. The clamp strap portion 18 in the specific embodiment shown in FIGS. 4-6 can be made in one piece with the bracket leg 13 by cutting out an outer contour in the bracket leg 13 and bending the strip shaped strap portion 18 out of the body of the bracket leg to leave a cutout 19 open in the bracket leg 13. The clamp strap portion 18 has a first end 20 that remains connected to the bracket leg 13. This first end 20 is connected to the bracket leg 13 in a region some distance above the engagement portion 14 of the bracket leg 13. At a second end of the clamp strap portion 18, which is situated above the first end 20, a tightening flange 21 is formed. The tightening flange 21 is provided with an aperture 22. Between the first end 20 and the flange 21 at the second end, the strap portion 18 has a curved shape.

The clamp strap portion 18 is bent inwardly such that it extends more inwardly of the bracket leg 13. Between the first end 20 and the flange 21 at the second end, the strap portion 18 has a curved shape. When the bracket halves 11 are positioned opposite each other as is shown in FIGS. 4 and 5, the clamp strap portions 18 extend towards each other and the tightening flanges 21 are positioned opposite each other. By passing a screw 23, a bolt, or another suitable tightening element through the apertures 22 of the respective tightening flanges 21 the tightening flanges 21 can be tightened towards each other and the pipe (not shown) can be clamped in engagement with the shell body 1 by the strap portions 18. The hanger bracket 10 thus has a clamp portion including the clamp strap portions 18 which can prevent or at least mitigate longitudinal movement of the pipe with respect to the shell body 1. Such longitudinal movement could for example be induced by temperature differences.

In relation to FIGS. 4 and 5 It is noted that the diameter of the head of the screw 23 is smaller than the width of the cutout 19, such that the screw head can engage the tightening flange 21, although the FIGS. 4 and 5 seem to suggest that the screw head engages the bracket leg 13 adjacent the cutout 19.

In another possible embodiment according to the present invention the shell body or shell bodies 1 may be suspended directly from one or more threaded rods, which are anchored to an overhead support such as a ceiling or a mounting rail (e.g. a strut rail). This embodiment is illustrated with reference to FIG. 7.

Figure 7:
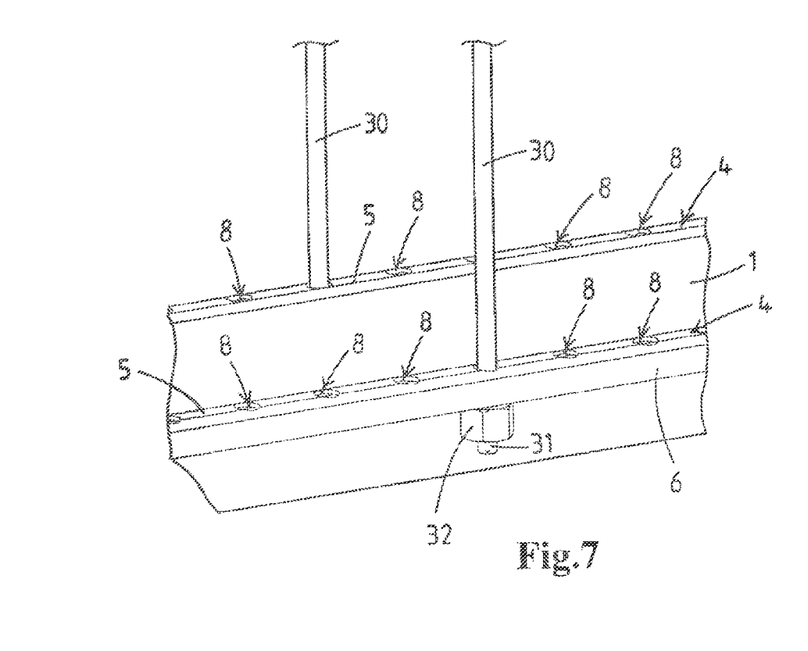
FIG. 7 shows in a view in perspective another preferred embodiment of a pipe support assembly according to the invention.

In FIG. 7 two threaded rods 30 are shown which extend downwardly from an overhead support where they are fixed. A lower end 31 of the threaded rod 30 is passed through one of the perforations 8 in the flange 4. A nut 32 is screwed on the lower end 31 of the threaded rod 30. The nut 32 can thus bear the flange 4 of the shell body 1. In the specific embodiment shown in FIG. 7 the folded over flange portion 6 bears on the nut 32. It is however also conceivable that the flange is flat and not folded as in FIG. 7, such that the flat flange bears on the nut 32. Another option, which is not shown in FIG. 7, is that an intermediate element such as a bushing or ring is arranged around the threaded rod 30 above the nut 32, which intermediate element bears on the nut 32 and which fits in the rim channel 7. The radial part 5 of the flange 4 then bears on an upper side of the intermediate element.

By two threaded rods 30 arranged to support the flanges 4 on opposite sides of the shell body 1, a simple and stable support structure is provided.

Figure 10:
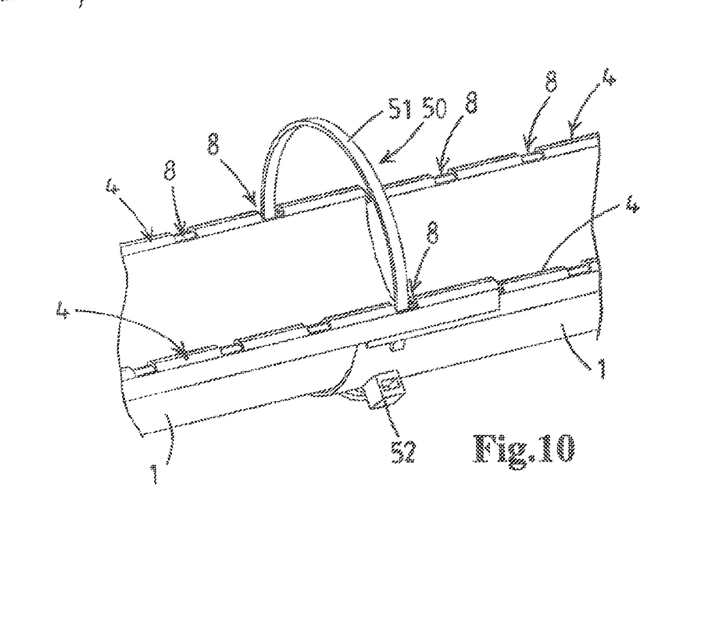
FIG. 10 illustrates in a view in perspective two pipe support shell bodies of FIG. 1 with a cable tie connecting the pipe shell bodies.

It is also possible to interconnect two shell bodies 1 by the threaded rods 30 if the end portions of the shell bodies are arranged in an overlapping fashion and perforations 8 of the two shell bodies are in register, comparable to what is visible in FIG. 10. The end portion 31 of the threaded rod 30 can then be inserted through the perforations 8 which are in register with each other after which a nut 32 can be screwed on the end portion 31 of the threaded rod 30.

Figure 8:
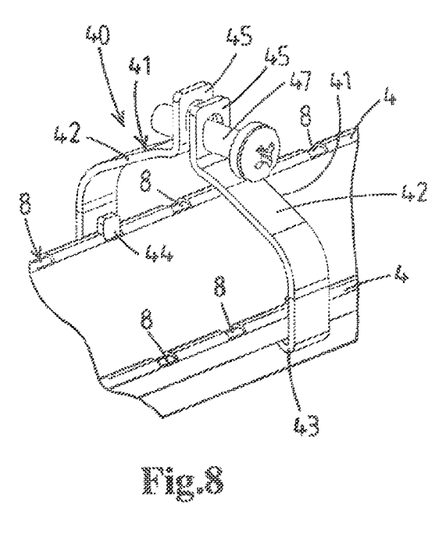
FIG. 8 shows in a view in perspective a pipe support shell body of FIG. 1 with a clamp mounted on it.

In FIG. 8 is illustrated a clamp 40 which is adapted to engage with the flanges 4 of the shell body 1. The clamp 40 is used to clamp the pipe to be supported into engagement with the shell body 1. The clamp can thus prevent or at least mitigate longitudinal movement of the pipe with respect to the shell body 1. Such longitudinal movement could for example be induced by temperature differences. In that sense the clamp 40 has the same function as clamp portion 18 of the hanger bracket 10 shown in FIGS. 4 and 5.

The clamp 40 comprises two clamp halves 41, each having a strap portion 42 adapted to be tightened around the pipe to be supported. The clamp halves 41 are preferably made of metal, but could also be made of another suitable material, e.g. plastics.

At one end of the strap portion 42 a hook portion 43 is formed. The hook portion 43 is adapted for a hooking engagement with the flanges 4 of the shell body 1 as can be seen in FIG. 8. In the embodiment of FIG. 8 the hook portion 43 has one projection 44 for engagement with one of the perforations 8 in the flange 4. This could also be more than one projections 44 comparable to the hook portion 15 of the hanger bracket of FIGS. 4-6 which has two projections 16. By the projection 44 the clamp half 41 is interlocked with the flange 4 and fixed in the longitudinal direction.

At another end of the strap portion 43 a tightening flange 45 is formed. The tightening flange 45 is provided with a hole 46 through which a tightening element 47 such as a screw or a bolt can be inserted.

In use the clamp halves 41 are each coupled to the opposite flanges 4 of the shell body 1 with their respective hook portions 43 and projections 44. The strap portions 42 are then arranged around the pipe and are tightened against the pipe by tightening the tightening flanges 45 towards each other by means of the tightening element 47.

Figure 9:
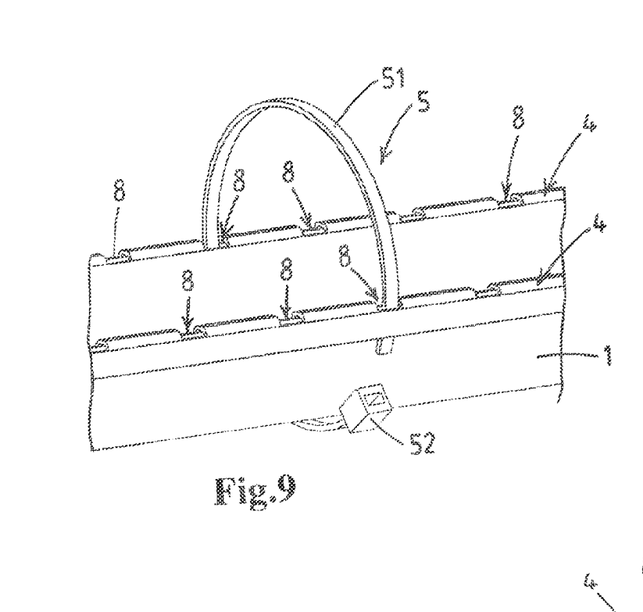
FIG. 9 shows in a view in perspective a pipe support shell body of FIG. 1 with a cable tie mounted to it.

As an alternative for the clamp 40 also a cable tie could be used to clamp the pipe in engagement with the shell body 1. This is illustrated in FIG. 9 where a cable tie 50 is shown which has a strap 51 and a head 52. The strap 51 is passed through a perforation 8 in each one of the flanges 4 on opposite sides of the shell body 1 and surrounds the shell body 1 and the pipe (not shown) received therein. The strap is tightened and locked by inserting its end in the head and pulling it as is known from common cable ties. This provides a cheap and simple solution to clamp a pipe in the shell body 1 according to the invention. However, cable ties are commonly made of plastics and tend to creep over time. Thus for a stronger and more reliable solution a clamp as shown in FIG. 8 might be preferable.

In FIG. 10 is illustrated how two shell bodies 1 can be arranged with overlapping end portions wherein perforations 8 in the flanges are in register and the cable tie 50 can be used to fix the two shell bodies 1, next to clamping the pipe into engagement with the shell bodies 1.

With reference to FIGS. 11-14 another aspect of the invention is described. Unlike the pipe support assemblies shown in FIGS. 4-7 including a hanger assembly for the pipe support shell body adapted to be suspended from an overhead support structure, the pipe support assembly according to this aspect allows the pipe support shell body to be supported from below by a support structure located underneath the pipe.

Figure 11:
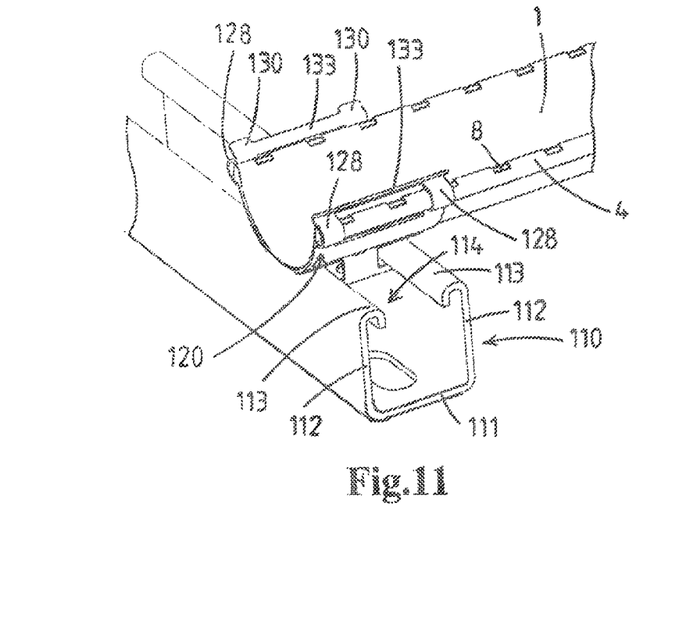
FIG. 11 shows in a view in perspective a pipe support assembly according to another aspect of the invention.

In FIG. 11 is shown that a mounting rail 110 is provided. The mounting rail 110 may be part of a supporting structure. It is a typical mounting rail having a bottom 111, two lateral walls 112 and an upper side including two flanges 113 defining a longitudinal slot 114 between them. In this example the mounting rail 110 is of the "strut rail" type having flanges 113 folded downwards towards the bottom 111.

The support assembly includes a saddle element 120 which can support the support shell body 1, which is of the type shown in FIG. 1. The saddle element 120 is better visible in FIGS. 12 and 13. The saddle element 120 in the embodiment shown is made in one piece of sheet metal, in particular it is made of spring steel by punching and bending.

Figure 12:
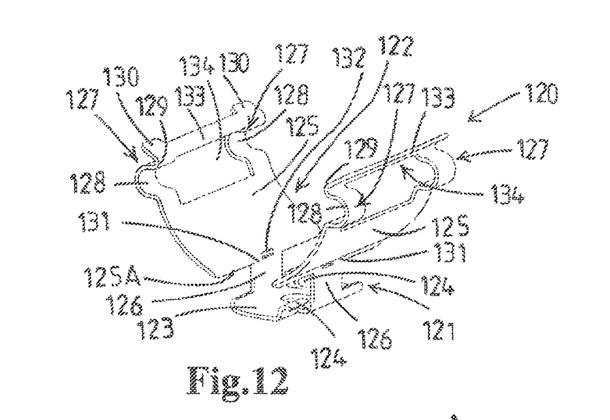
FIG. 12 shows in a view in perspective a saddle element of the pipe support assembly of FIG. 11.
Figure 13:
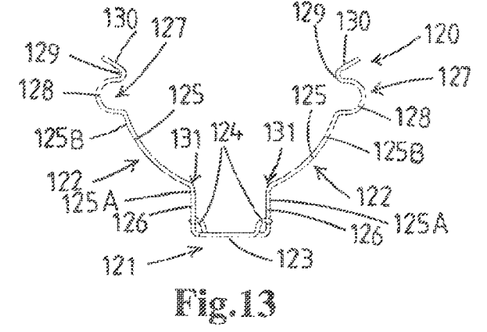
FIG. 13 shows a front elevational view of the saddle element of FIG. 12.

The saddle element 120 comprises an anchoring portion 121 and a saddle portion 122. The anchoring portion 121 comprises an oblong anchoring plate 123 which has such dimensions that it can be aligned with its longitudinal axis with the slot 114 of the mounting rail 110 and then inserted between the flanges 113 into the channel-like rail 110. Then the anchoring plate 123 can be rotated, for example a ¼ turn and the plate will engage the flanges 113. To engage the flanges firmly, the plate is preferably provided with resilient tongues 124 which are bent out of the plane of the plate 123.

The saddle portion 122 comprises two opposed curved support plates 125 which have a curvature substantially corresponding with the curvature of the pipe support shell 1. The curved support plates 125 support the pipe support shell 1 from below as is shown in FIG. 11.

A connecting leg 126 connects a first end 125A of each the curved support plates 125 to a longitudinal side of the anchoring plate 123.

At a second end 125B of the curved support plates 125 snap members 127 are formed. The snap members 127 are in the specific embodiment shown formed as guiding loops 128 with a generally U-shaped cross section. These guiding loops 128 bulge outwardly from the second end 125B of the saddle portion and are dimensioned such that they receive with a concave side a portion of the flange 4 of the pipe support shell 1 as can be seen in FIG. 1.

In the particular embodiment shown, each curved support plate 125 has two snap members 127, one at each longitudinal end.

The guiding loops 128 have a distal end 129, i.e. the end facing away from the curved support plate 125. At the distal end 129 a guiding lip 130 is formed. The guiding lip 130 has a slanting orientation inwards and downwards. The guiding lips 130 on opposite sides of the saddle portion 122 are thus adapted to engage the corresponding edge if the folded over flange portions 6 of the opposite flanges 4 of the pipe support shell 1 and by a wedge mechanism force the guiding loops 128 outwardly such that the loops 128 can move past the flange 4 and snap back over the flange 4. The curved support plates 125 hinge by the wedging force at adjoining region 131 between the legs 126 and the curved support plates 125. In a possible embodiment the adjoining region 131 is provided with a weakening recess or perforation 132, such that spreading of the curved support plates 125 is facilitated such that the pipe support shell 1 can be inserted from above in the saddle element 120. In the embodiment shown the guiding lips 130 on the same curved support plate 125 are interconnected by a connecting web 133. These connecting webs 133 form an extension of the guiding tongues and facilitate the distribution of the force of the flanges 4 of the pipe support shell body 1 to spread the curved support plates such that the guiding loops 128 can snap around the flanges 4.

Figure 14:
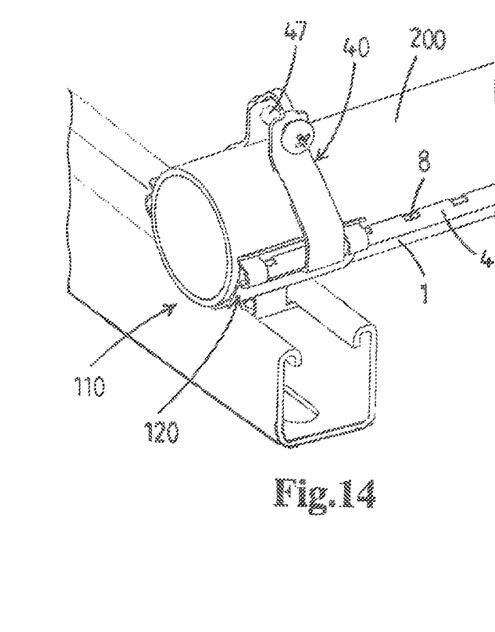
FIG. 14 shows in a view in perspective the pipe support assembly of FIG. 11 combined with a clamp shown in FIG. 8.

In a further embodiment the clamp 40 that is described with reference to FIG. 8 can collaborate with the saddle element 120, as is shown in FIG. 14. As can be seen a pipe 200 is arranged in the shell body 1 which is supported from below by the saddle element 120 arranged on the mounting rail 110 as described in the above. The clamp 40 has the hook portions 43 with the projection 44 for engagement with one of the perforations 8 in the flange 4. The hook portion 43 can engage the flange 4 through an aperture 134 in the saddle element 120 defined between the loops 128, an upper edge 125B of the curved support plate 125 and the connecting webs 133. The width of the aperture 134 is such that at least one perforation 8 is reachable between the two loops 128 such that a projection 44 can be inserted in the perforation. In a practical embodiment the pitch between the two loops 128 on one curved support plate 125 corresponds with two times the pitch between the perforations 8 in the flange 4. In that event there are always one or two perforation reachable through the aperture 134.

In the above the shell body 1 is shown in separate examples in a combination with a hanger bracket 10 (FIGS. 3-5) or with threaded rods 30 (FIG. 7) as hanger assemblies; with a saddle element 120 supporting from below; and with a clamp 40 (FIG. 8) or with a cable tie 50 (FIGS. 9-10) as clamping means. It should be understood, however, that a pipe support assembly according to the invention encompasses the shell body 1 or shell bodies 1, combined with different combinations of the mentioned hanger assemblies 10 and 30, saddle element and clamping means 40 and 50. For example, a pipe support assembly according to the invention could thus combine hanger brackets 10 and threaded rods 30 as shown in FIGS. 3, 4 and 7 respectively to suspend a body shell 1 or more body shells 1. And there could be used clamps 40 and cable ties 50 as alternatives or in addition to each other.

The invention claimed is:

1. A pipe support assembly comprising:
   a pipe support shell body having a substantially semi-cylindrical wall portion conforming to an outer contour of a pipe to be supported, and having a length which is greater than a width thereof, wherein the shell body has an open top flanked by longitudinal rims and a flange formed at each of said rims,
   at least one hanger assembly adapted to be suspended from an overhead support structure and including an engagement portion for engaging at least one of the flanges of the pipe support shell body, wherein the flanges extend outwardly from the respective longitudinal rims and are each provided with a series of perforations distributed over the length thereof, and wherein the engagement portion of the hanger assembly is adapted to be inserted at least partially through at least one of the perforations in one of the flanges, and wherein said hanger assembly comprises a hanger bracket having an engagement portion comprising a hook member at a terminal end of the bracket adapted for a hooking engagement with one of the flanges of the shell body, and wherein the hook member has one or more projections adapted to be inserted through one or more of the perforations in the flange.

2. The pipe support assembly according to claim 1, wherein the hanger bracket has two depending bracket legs each including said engagement portion, wherein the hook member is formed at the end of each of the bracket legs.

3. The pipe support assembly according to claim 1, wherein the hanger bracket comprises a clamp portion connected to each of the bracket legs and extending over the open top of the shell body.

4. The pipe support assembly according to claim 3, wherein the clamp portion is adapted to be tightened around the pipe to be supported.

5. The pipe support assembly according to claim 4, wherein the clamp portion comprises two clamp strap portions, each one connected to one of the bracket legs, and each one at an end remote from the bracket legs being provided with a tightening flange, wherein the tightening flanges face each other and are provided with an aperture and a tightening element is provided to extend through said apertures and tighten the tightening flanges towards each other.

6. The pipe support assembly according to claim 3, wherein the clamp portions are made in one piece with the bracket legs.

7. The pipe support assembly according to claim 6, wherein the outer contour of the clamp portion is cut out of the bracket leg and bent away from the bracket leg.

8. The pipe support assembly according to claim 5, wherein the tightening element is a screw or a bolt.

9. The pipe support assembly according to claim 1, wherein the hanger assembly includes a threaded rod and the hanger bracket has a base adapted to be suspended from said threaded rod.

10. The pipe support assembly according to claim 1, wherein the hanger bracket comprises two separate bracket halves, which are joined.

11. The pipe support assembly according to claim 10, wherein the bracket halves are joined at the base.

12. The pipe support assembly according to claim 1, wherein the hook member of the hanger bracket has at least two projections for engagement with two of the perforations in the flange.

13. The pipe support assembly according to claim 1, wherein said at least one hanger assembly comprises a threaded rod and a threaded nut, said threaded rod extending downwardly from the overhead support, wherein the engagement portion includes a lower end of the threaded rod, adapted to pass through the perforations in the flanges, and wherein the nut is adapted to be screwed on the lower end of the threaded rod so as to bear the flange of the shell.

14. The pipe support assembly according to claim 1, wherein said assembly furthermore comprises a clamp comprising a strap portion adapted to be tightened around the pipe to be supported and at least one end a hook portion adapted for a hooking engagement with one of the flanges of the shell body.

15. The pipe support assembly according to claim 14, wherein the hook portion at the at least one end of the strap portion has one or more projections for engagement with one or more of the perforations in the flange.

16. The pipe support assembly according to claim 14, wherein the clamp has said hook portion at both ends of the strap portion.

17. The pipe support assembly according to claim 1, wherein said assembly furthermore comprises a cable tie which in a mounted state extends through said perforations in the flanges of the shell body, and is tied around the pipe to be supported.

18. The pipe support assembly according to claim 17, comprising at least two shell bodies, wherein end portions of the shells are arranged in an overlapping fashion such that at least a part of the series of perforations in the flanges are in register with each other, and wherein the cable tie is passing through the perforations to fix the shell bodies with respect to each other.

19. The pipe support assembly according to claim 1, wherein the longitudinal rims adjoin directly the semi-cylindrical wall portion.

20. The pipe support assembly according to claim 1, wherein the shell flanges are folded over, such that each shell flange defines a rim channel with the semi-cylindrical wall portion of the shell.

21. The pipe support assembly according to claim 1, wherein the part of the flanges having the perforations is facing the substantially the same direction as the open top of the shell body.

22. A pipe support shell body consisting of:
a substantially semi-cylindrical wall portion having a length which is greater than a width thereof, and having longitudinal rims; and
outwardly extending flanges formed at each of the longitudinal rims of the semi-cylindrical wall, wherein the flanges are provided with through holes distributed over the length thereof.

23. The pipe support shell body according to claim 22, wherein the longitudinal rims adjoin directly the semi-cylindrical wall portion.

24. The pipe support shell body according to claim 22, wherein the shell flanges are folded over, such that each shell flange defines a rim channel with the semi-cylindrical wall portion of the shell.

25. The pipe support shell body according to claim 22, wherein the part of the flanges having the perforations is facing the substantially the same direction as the open top of the shell body.

26. A pipe support assembly comprising:
a pipe support shell body according to claim 22, and
at least one standing saddle element comprising an anchoring portion adapted to be anchored to a support structure and a saddle portion to receive the convex side of the semi-cylindrical wall of the pipe support shell, the saddle portion including snap members at its rims to snap around the flanges of the pipe support shell body.

27. The pipe support assembly according to claim 26, wherein the anchoring portion has an oblong shape adapted to be aligned and inserted into a slot or oblong aperture of a channel shaped mounting rail, and after insertion to be turned to an anchoring position.

28. The pipe support assembly according to claim 26 wherein the snap members are guiding loops that bulge outwardly from an edge of the saddle portion for receiving the flanges of the pipe support shell body.

29. The pipe support assembly according to claim 28, wherein the guiding loops at a distal end thereof have a guiding lip adapted to engage a flange edge of the pipe support shell and to force the hooks outwardly such that the hooks can move past the flange and snap back over the flange.

30. The pipe support assembly according to claim 26, wherein the saddle element is formed in one piece from metal, in particular steel, more in particular spring steel by cutting and bending.

* * * * *